Feb. 28, 1956 P. K. WEIMER 2,736,763

COLOR TELEVISION PICKUP SYSTEMS

Filed May 27, 1953

INVENTOR.

Paul K. Weimer

BY [signature]

ATTORNEY

United States Patent Office 2,736,763
Patented Feb. 28, 1956

2,736,763

COLOR TELEVISION PICKUP SYSTEMS

Paul K. Weimer, Princeton, N. J., assignor to Radio Corporation of America, a corporation of Delaware Application May 27, 1953, Serial No. 357,865

11 Claims. (Cl. 178—5.4)

This invention relates to color television pickup systems and more particularly to color television pickup systems of the type employing a single camera tube to simultaneously derive a plurality of component color signals.

A pickup tube of this type is described in U. S. Patent No. 2,446,249 issued on August 3, 1948, to Alfred C. Schroeder. In the tube described therein, component color image signals are derived from a plurality of interleaved conducting signal strips, each acting as a signal plate for a respective strip portion of a scanned mosaic charged in accordance with a particular one of the component colors. As employed in a three-color television system, for example, signals representing respectively red, green and blue component colors are derived from three separate output leads respectively connected to spaced ones of the interleaved conducting strips.

Another example of a single camera tube for simultaneously deriving a plurality of component color signals is a pickup tube of the photoconductive type as described in the co-pending application of Paul K. Weimer, Serial No. 344,497, filed March 25, 1953, and entitled "Cathode Ray Tube and Target." An embodiment of the tube disclosed therein includes a target comprising a glass base; a plurality of red, green and blue filter strips deposited thereon and interleaved in a predetermined sequence; a plurality of optically transparent, electrically conductive strips laid down on the filter strips such that a given conductive strip is superimposed upon a given one of the said filter strips; a continuous layer of photoconductive material, such as porous antimony sulphide, deposited over the conductive strips; and respective red, blue and green bus bars connected to the appropriate ones of said conductive strips. As such a target is scanned by a cathode ray beam each bus bar is supplied its component color signal from the signal strips associated therewith in response to the discharge of those portions of the target which received an image representative charge as light of the respective component color passed through the optical filter strips associated therewith.

A problem of maintaining separation of component color signals often arises in a single camera tube of the type employing interleaved signal strips, such as the aforementioned Schroeder and Weimer tubes, primarily due to the coupling capacity between the respective sets of strips and secondarily due to leakage between strips. In the co-pending application of Edwin A. Goldberg, Serial No. 348,764, filed April 14, 1953, and entitled "Amplifying Systems," now U. S. Patent No. 2,714,129, issued July 26, 1955, a solution to this problem of color crosstalk is embodied in the use of negative feedback in the signal amplifiers coupled to the output leads of a tube of this type. The input impedance of each component color signal channel is reduced dynamically to obtain satisfactory separation of the component color signals, while reductions in signal-to-noise ratio which would accompany the alternative use of a low physical input impedance are avoided.

In another co-pending application, that of Harold Borkan filed April 29, 1953, Serial No. 351,840 and entitled "Amplifying Systems," now U. S. Patent No. 2,714,130, issued July 26, 1955, the use of capacitive feedback, whereby the input impedance of each component color signal channel is essentially capacitive over a significant portion of the video frequency range, is proposed so that the output signal level of each feedback amplifier may be maintained as high above the noise level of a succeeding signal amplifying or other signal utilization stage as is compatible with satisfactory signal separation.

It is now generally proposed that in color television systems it is not necessary to obtain color information over the entire video frequency range normally employed in monochrome television systems. That is, utilization of color information over only the low frequency portion of the total video frequency range is sufficient, the higher frequency image details being effectively reproduced in black and white from brightness information representative of all the component colors. In the co-pending application of Harold Borkan and Paul K. Weimer filed May 1, 1953, Serial No. 352,542, and entitled "Color Television Pickup Systems," now U. S. Patent 2,698,874, issued January 4, 1955, a pickup tube system is disclosed which is particularly suitable for use in such color television systems wherein color information is utilized over only the lower information portion of the video frequency range. In accordance with the invention disclosed therein a system is provided for deriving from a single camera tube of the type employing interleaved signal strips a plurality of respective component color signals over the lower frequency portion of the video frequency range with a reasonable signal-to-noise ratio and a minimum of crosstalk, and a brightness signal over the remaining portion of the video frequency range which has an exceptionally good signal-to-noise ratio. In accordance with an embodiment of the Borkan and Weimer invention referred to immediately above, a negative feedback path is established in each component color signal channel, the impedance of each feedback path being such that over the color-significant portion of the video frequency range the input impedance of each channel is sufficiently low relative to the impedances cross-coupling the target strip sets that satisfactory separation of component color signals is maintained, whereas over the remaining portion of the video frequency range the input impedance is no longer maintained low relative to the inter-strip impedances so that appreciable cross-coupling of the component color signals in the target structure is permitted. Adding means are coupled to all of the signal channels to combine the output signals of each. As a result, a substantial degree of noise bucking occurs in the adding operation, particularly in the high frequency portion of the video frequency range. High frequency noise generated in any of the signal amplifiers finds a readily available route through its associated feedback path and the inter-strip coupling impedances to the input circuits of the other channel amplifiers. Direct cancellation of this noise occurs in the adding means since the noise in the output of the generating amplifier is opposite in polarity to the resultant noise component appearing in the outputs of the other channel amplifiers. By permitting noise crosstalk in the higher frequency range wherein noise power is much greater than in the low frequency range, a very significant portion of the noise power associated with the channel amplifiers is removed from the pickup system through cancellation in the adding means.

In accordance with the present invention an improved amplifying system is provided for use with a pickup tube of the type employing interleaved signal strips, whereby component color signal separation is maintained over the color significant portion of the video frequency range, and whereby crosstalk between signal strip sets is positively encouraged over the remaining portion of the video frequency range so as to obtain a mixed high brightness signal in the target structure itself with an exceptionally good signal-to-noise ratio.

In accordance with an embodiment of the invention the positive encouragement of crosstalk between signal strip sets is effected by providing each component color channel amplifier with an input impedance which is essentially inductive over the mixed high frequency range. Thus by increasing the input impedance of each channel over this region while the reactance of the inter-strip coupling capacities continues to drop with frequency, a condition of essentially 100% crosstalk is rapidly approached.

The signal-to-noise ratio in this region is also significantly improved in that the amplitude of tube noise generated in each channel amplifier is inversely proportional to the shunt impedance presented by the inter-strip coupling capacities in series with the input impedances of the other channels. Thus, noise generation in each channel drops considerably in this frequency region wherein all the channel input impedances are rising. Increase of the input impedances in this region also results in an increase in the output level of each channel amplifier with a resultant greater freedom from masking by noise in the subsequent stages.

The invention thus provides a color television pickup system in which respective component color channels are directly provided with respective low frequency component color signals, and mixed high brightness signals at a high signal-to-noise ratio without the necessity of additional signal combining means.

Accordingly it is a primary object of the present invention to provide an improved color television pickup system.

It is a further object of the present invention to provide a simplified color television pickup system for developing color information with a satisfactory signal-to-noise ratio and a minimum of color crosstalk over one portion of the signal frequency range, and developing substantially noise-free brightness information over the remaining portion of the signal frequency range.

It is an additional object of the present invention to provide a system for operating a color pickup tube of the type employing interleaved signal strips such that crosstalk between strip sets is discouraged over a portion of the signal frequency range to permit component color signal separation, and crosstalk between strip sets is encouraged over the remaining portion of the signal frequency range so that the interleaved signal strips may develop substantially noise-free brightness information.

It is a further object of the present invention to provide an improved camera preamplifier having an input impedance which is essentially inductive over a given portion of the signal frequency range.

Another object of the present invention is to provide a color television camera system of the type employing a single strip-target pickup tube with an improved amplifying system employing capacitive feedback over one portion of the signal frequency range and inductive feedback over a succeeding portion of the signal frequency range.

Other objects and advantages of the present invention will be apparent to those skilled in the art from a reading of the following detailed description and an inspection of the accompanying drawing in which.

Figures 1, 2, 3:
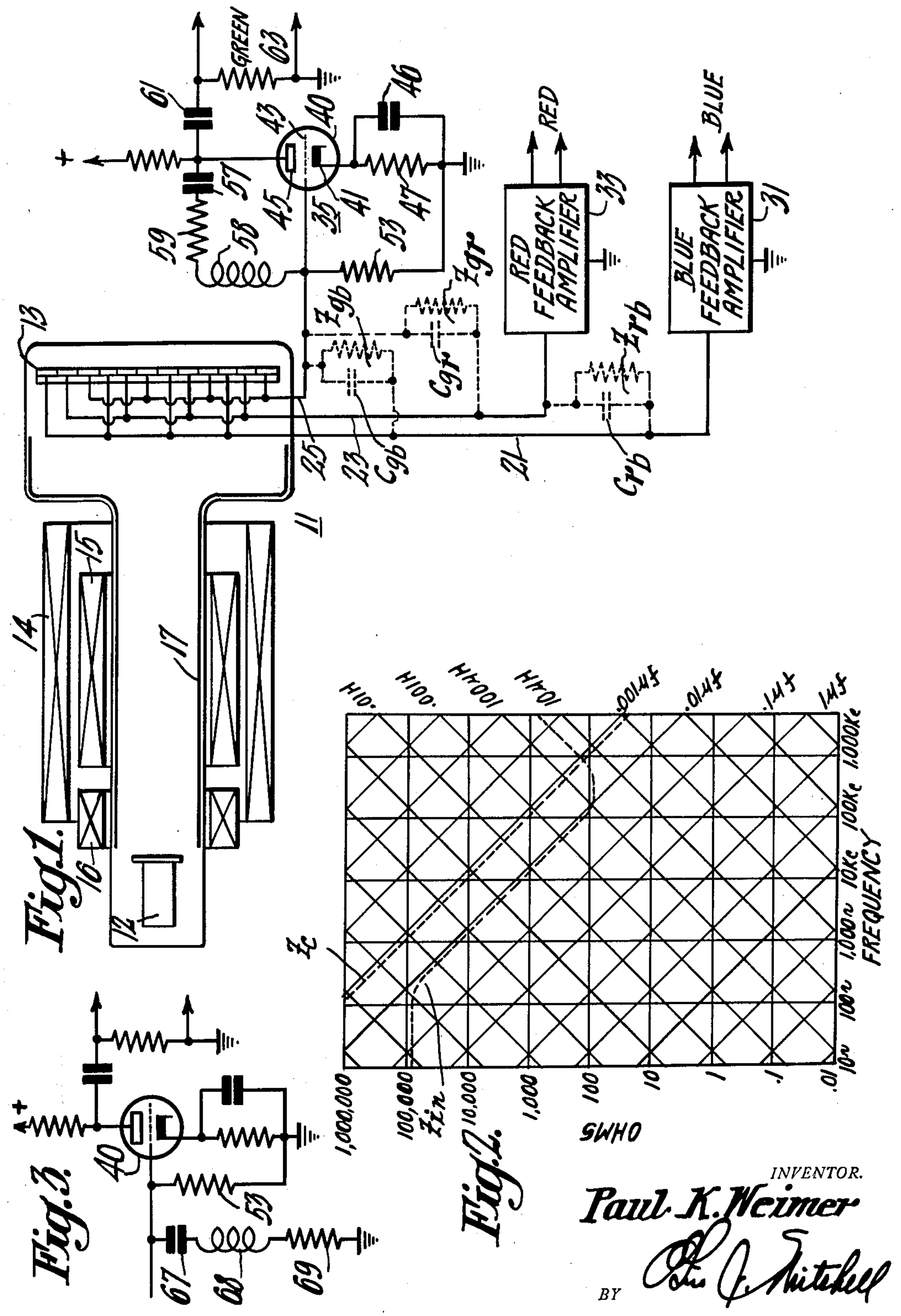
Figure 1 illustrates in block and schematic form a color pickup tube system embodying the principles of the present invention.
Figure 2 illustrates graphically the relationship between amplifier input impedances and inter-strip reactances in a system of the type shown in Figure 1.
Figure 3 illustrates schematically another form of amplifying apparatus which may be employed in the pickup system of Figure 1 to achieve the input impedance characteristic illustrated in Figure 2.

In Figure 1 a pickup tube 11 of the type disclosed in the aforementioned Weimer application, Serial No. 344,497, is illustrated schematically. The tube is provided with a conventional electron gun 12, which may include the usual cathode, control electrode and one or more accelerating electrodes, which are connected to operating potentials in a well known manner. A target of the previously mentioned character is illustrated as target 13 at the opposite end of the tube 11. Means are provided for focusing the electron beam developed by electron gun 12, and for scanning the beam over target 13 to develop a conventional scanning raster. These means may include focusing coil 14 and deflection yoke 15; an alignment coil 16 may additionally be provided. An electrode (not shown) permeable to the electron beam may be positioned adjacent to the target 13 and utilized together with focus coil 14 to ensure that the beam in its final approach to the surface of target 13 is normal thereto. A final accelerating electrode 17 may be in the form of a conducting coating on the interior of the envelope of the tube 11.

While the target 13 has not been illustrated in full detail, it will be appreciated from the previous description that the output leads 21, 23 and 25, which may take the form of bus bars incorporated in the target structure, are supplied with the respective blue, red and green component color signals derived from the appropriate conductive strips in the target structure. As illustrated, the respective output leads 21, 23 and 25 are coupled to separate color channels which include a blue feedback amplifier 31, a red feedback amplifier 33 and a green feedback amplifier 35. Since in accordance with the invention the three amplifiers may be substantially identical, only the circuit details of the green amplifier 35 have been shown in Figure 1, while the blue and red amplifiers 31 and 33 have been shown in block form.

The green amplifier 35 includes an amplifying stage incorporating an electron discharge device 40 which may, as illustrated, be a triode having a cathode 41, control grid 43 and a plate 45. The cathode 41 is connected to a point of reference potential (i. e. ground in the illustrated embodiment) via a cathode resistor 47 shunted by by-pass capacitor 49. Plate 45 is connected to a source of anode potential (not illustrated) via the plate resistor 51. A coupling capacitor 61 and a load resistor 63 connected in series between the plate 45 and ground complete an output circuit for the amplifying stage. The green output signal is developed across the output resistor 63 and may be applied to subsequent signal utilization apparatus in the green channel which may, for example, include subsequent signal amplifying stages.

A feedback path is established between the output electrode and input electrode of the amplifying stage by connecting in series a capacitor 57, a resistor 59 and an inductance 58 between the plate 45 and grid 43 of amplifier tube 40. The capacitor 57 may, as in the aforementioned Goldberg application, serve only as a blocking capacitor and thus be of negligible importance in determining the input impedance of amplifier 35. However, preferably, the capacitor 57 will rather have such a capacity as to be significant in determining the input impedance of amplifier 35 over the lower frequency color-significant portion of the video signal range, as in the aforementioned Borkan application. The value of capacitor 57 may be chosen in relation to the value of inter-strip coupling capacities $$C_c (C_c = C_{gb} = C_{gr} = C_{rb})$$

so that the effective input impedance of the amplifying stage is a desired fraction of the value of the inter-strip coupling impedances over the color significant portion of the video signal frequency range. As an example, the value of feedback capacitor 57 may be chosen so that the effective input impedance $Z_{in}$ of green amplifier stage 35 bears approximately a 1:10 relationship to the shunt impedance ($Z_s$) presented by the strip coupling impedances, $Z_{gb}$ and $Z_{gr}$, to the input of amplifier 35 ($Z_s$ being essentially the parallel combination of $Z_{gb}$ and $Z_{gr}$ under these conditions). The proper value of feedback capacitor 57 may be approximately determined by the expression:

$$C_{57}=\frac{2C_c}{x\mu}$$

where $x$ is the desired ratio of $$\frac{Z_{in}}{Z_s}$$

and $\mu$ is the forward gain of the amplifying stage. It may be readily appreciated that while the amplifying system illustrated in Figure 1 employs single stage feedback loops, the principles of the invention are also applicable where a multi-stage feedback loop is employed (in which case the $\mu$ in the above expression would be the total forward gain of the multi-stage arrangement).

As has been noted before, the inter-strip coupling impedances are not solely capacitive, but rather include a leakage resistance component, which is effectively in shunt with the coupling capacity component. At very low signal frequencies the interstrip coupling impedances will approach the value of these leakage resistances. Thus, if it is desired to substantially maintain the 1 to 10 ratio of $Z_{in}$ to $Z_s$ in the range of very low signal frequencies, a grid leak resistor 53 of appropriate size may be connected between the grid 43 and ground. This grid leak resistor 53, which may in an illustrative example be of the order of 50,000 ohms, is effectively in shunt with the dynamic input impedance and establishes a maximum value which the input impedance approaches in the range of very low frequencies.

In cases where the leakage resistance value is low, a low valued grid leak resistor would be called for to obtain the above effect, but its use would preferably be avoided in view of the accompanying increase in equivalent input noise current. Thus as an alternative in these cases, and appropriately valued resistor may be shunted across capacitor 57 in the feedback loop to obtain the desired ratio in the very low frequency range. A blocking capacitor would then be additionally required in the feedback path to prevent plate voltage from appearing at grid 43.

If it were attempted to maintain the 1:10 ratio of $Z_{in}$ to $Z_s$ throughout the entire signal frequency range, the output signal level in the high frequency portion of the video frequency range would be so low as to be substantially masked by the noise in a subsequent amplifying or other utilization stage. However, as was recognized in the co-pending application of Paul K. Weimer, Serial No. 234,401 filed June 29, 1951 and entitled "Color Television Camera," now U. S. Patent No. 2,689,270, issued September 14, 1954 it is not necessary to maintain component color signal separation in the higher frequency range if these frequencies are to be devoted to brightness information only. In the aforementioned Borkan and Weimer joint application, signal separation was no longer maintained at these high frequencies, the input impedance of each channel amplifier being permitted to appear essentially resistive thereafter. An appreciable degree of mixing of the component color signals is therefore permitted in the target structure of the tube itself. However, this mixing is not of a sufficient degree to obtain mixed high brightness information without the utilization of subsequent signal combining means. The present invention on the other hand introduces an inductance 58 into the feedback path of amplifier 35 which not only ceases discouragement of crosstalk over the high frequency range but actually encourages color signal cross-talk by increasing the input impedance of each channel amplifier over this region. The degree of color crosstalk in the target structure over most of the high frequency range is thus sufficiently high to obtain a satisfactory mixed high signal in each channel without the need for utilizing additional adding means. An explanation of this feature and other features of the present invention will be readily aided by reference to Figure 2 in which the plot labeled "$Z_{in}$" represents the input impedance of the amplifier 35 over the video signal frequency range, and the plot labeled "$Z_c$" represents the reactance of the parallel combination of $C_{gb}$ and $C_{gr}$ over this range. As shown in Figure 2, the input impedance of amplifier 35 is essentially resistive at very low signal frequencies (as determined by grid leak resistor 53), essentially capacitive over the subsequent color-significant portion of the video frequency range, and essentially inductive over the remaining high frequency portion of the range. It may be seen that over the color-significant portion of the video signal range (approximately 100 cycles to 1 mc.) the reactance of the parallel combination of $C_{gb}$ and $C_{gr}$, which is effectively in shunt with the input circuit of amplifier 35 is approximately 10 times as great as the input impedance of amplifier 35 (decreasing gradually to a smaller ratio as 1 mc. is approached). Thus only a small permissible degree of color cross-talk exists over this range portion. However, in the vicinity of 1 mc. the input impedance of amplifier 35 commences to appear inductive. As the input impedance thus becomes considerably larger than the coupling capacity reactance, crosstalk between signal strip sets rises to an almost complete crosstalk condition whereby the signals generated in any one set of strips are essentially equally divided among the three channels. Thus the high frequency components of the output signal of the green amplifier 35 (as well as of the red amplifier 33 and the blue amplifier 31) are essentially mixed signals representative of brightness information.

It may be noted that the resistor 59, which is in series with the capacitor 57 and the inductance 58 in the feedback path, provides a "bottom" for the input impedance characteristic in the range of transition from its capacitive appearance to its inductive appearance, as illustrated in Fig. 2. A discontinuity in the input impedance characteristic is avoided, since resistor 59 establishes a minimum value for the input impedance and thus prevents the input impedance from dropping to an unreasonably low value in the vicinity of the frequency of series resonance for the capacitor 57 and inductance 58. Moreover, if capacitive feedback in the color signal range is not employed and capacitor 57 serves only as a blocking capacitor, the resistor 58 will determine, as in the aforementioned Goldberg application, the input impedance of amplifier 35 at a value low enough to permit satisfactory component color signal separation in the low frequency range.

Although no additional signal adding means are shown in the system of Figure 1 wherein noise bucking may advantageously take place as in the aforementioned copending joint application, the signal-to-noise ratio of the mixed high signals appearing in the respective channels of a system employing the principles of the present invention will nevertheless be high for reasons which may now be described in greater detail.

If the input impedance of each channel is small compared to the reactance of the inter-strip coupling capacities, the coupling capacities $C_{gb}$ and $C_{gr}$ each appear to be directly shunted across the input circuit of tube 40. At high signal frequencies, under these conditions, a low capacitive reactance thus shunts the input circuit of tube 40, and the tube noise generated in tube 40 may consequently be appreciable. (The effect of shunt capacity on tube noise is presented in greater detail in the aforementioned Borkan application.)

However, if the input impedance of each channel is not small compared to the reactance of inter-strip coupling capacities, the input circuit of the tube 40 does not appear to be shunted directly by the coupling capacities $C_{gb}$ and $C_{gr}$, but rather is shunted by respective series combinations in which the input impedances of the blue and red amplifiers 31 and 33 are of significant magnitude. In the present invention the input impedance of each channel is made essentially inductive in the mixed high range. Thus, in this range, the channel input impedances rapidly become significantly large compared to the reactance of the inter-strip coupling capacities. Therefore, instead of being shunted by a declining capacitive reactance in this range, the input circuit of tube 40 is effectively shunted by a rising inductive reactance. As a consequence, the tube noise developed in amplifying tube 40 (and in the corresponding tubes of amplifiers 31 and 33) in the mixed high range is substantially lessened.

As a further contributing factor to the achievement of a high signal-to-noise ratio for the mixed high signal, the rising characteristic of the input impedance ensures that the output signal level of the feedback stage may rise considerably above the noise level in a succeeding amplifying or other signal utilization stage.

Figure 3 illustrates another form which the amplifiers 31, 33 and 35 may take in a pickup system embodying the general principles of the present invention. The non-feedback amplifier illustrated in Figure 3 may also provide an input impedance characteristic of the character illustrated by curve $Z_{in}$ in Figure 2. In contrast with the feedback amplifier shown in Figure 1 wherein the input impedance characteristic $Z_{in}$ is achieved dynamically through the use of negative feedback of the previously described nature, the amplifier of Figure 3 is provided with a series combination of physical impedances in its input circuit, which combination has the desired relationships to the inter-strip coupling impedances in the color and mixed high signal ranges. A capacitor 67, an inductance 68 and a resistor 69 are connected in series between the control grid 43 of tube 40 and ground. The values of these series elements may be chosen such that the impedance of the combination generally follows the form of the characteristic $Z_{in}$ illustrated in Figure 2; i. e. being essentially capacitive in the low frequency color-significant portion of the video range, essentially inductive in the mixed high range portion, and approaching a reasonable minimum value (essentially determined by resistor 69) in the range of capacitive-to-inductive transition (in the vicinity of the frequency of series resonance for the capacitor 67 and inductance 68).

The value of capacitor 67 may, as in the system of Figure 1, be chosen relative to the inter-strip coupling impedances to obtain in the color signal range portion a ratio of $Z_{in}$ to $Z_s$ of the order of 1 to 10, for example, and the grid leak resistor 53 may again be so proportioned as to maintain this ratio in the very low frequency range wherein the inter-strip coupling impedances appear essentially as leakage resistances. Alternatively, the capacitor 67 may be omitted from the series combination, and the input impedance caused to appear resistive at a low enough value for satisfactory signal separation over a comparable range of frequencies. Although, as may be appreciated from the teachings of the aforementioned Borkan application, the latter alternative involves a sacrifice in output signal level in the color signal range, this may not necessarily be very objectionable, particularly where noise in the subsequent signal stage is at a low level.

However, a common disadvantage to the alternative forms of the non-feedback amplifier of Figure 3 as compared with feedback amplifier of Figure 1 resides in the use of a low-valued resistor in the input circuit of tube 40 to achieve a low input impedance. The relative improvement in signal-to-noise ratio of the amplifying stage in the color signal range when the low input impedance is effected dynamically rather than by the use of a low-valued physical impedance in the input circuit has been previously discussed herein, and in the aforementioned co-pending Goldberg and Borkan applications. Thus, the use of the non-feedback amplifier of Figure 3 will generally involve some sacrifice of signal-to-noise ratio in the low frequency color signal range. However it may be noted that this will be less serious if capacitor 67 is included in the series combination.

Nevertheless, the non-feedback amplifier of Figure 3 as well as the feedback amplifier of Figure 1, in their illustrated forms or modified as suggested in their description, illustrate the general principles of the present invention. In accordance with the invention, each of the component color signal channels is provided with a signal amplifier having an input impedance which remains sufficiently low over the color-significant portion of the video range to discourage color crosstalk and permit a satisfactory degree of component color signal separation, but which rises rapidly in the remaining portion of the video range to encourage essentially complete color signal crosstalk and to thus obtain with a high signal-to-noise ratio a mixed high brightness signal which has been mixed in the strip target structure itself.

What is claimed is:

1. In a color television system wherein it is desired to utilize color information over only a given portion of the total video frequency range, said color television system including a cathode ray pickup tube having an electron target structure comprising a plurality of interleaved sets of conducting strips for deriving respective component color signals, a signal amplifying system comprising a plurality of signal amplifying means, each of said strip sets being coupled to a respectively different one of said signal amplifying means, and means for rendering the effective input impedance of each said signal amplifying means directly proportional to frequency over a portion of the video frequency range higher than said given range portion.

2. In a color television system wherein it is desired to utilize color information over only a portion of the total video frequency range, said color television system including a cathode ray pickup tube having an electron target structure comprising a plurality of interleaved sets of conducting strips for deriving respective component color signals, a signal amplifying system comprising a plurality of signal amplifying means, each of said strip sets being coupled to a respectively different one of said signal amplifying means, and means for controlling the effective input impedance of each of said signal amplifying means in accordance with frequency such that over said portion of the video frequency range wherein color information is utilized signal crosstalk between strip sets is discouraged by the relatively low value of said effective input impedances, whereas over the remaining portion of the video frequency range wherein color information is not utilized essentially complete signal crosstalk between strip sets is encouraged by the relatively high value, increasing with frequency of said effective input impedances.

3. In a color television system wherein it is desired to use color information over only a portion of the total video frequency range, a pickup tube system comprising the combination of a cathode ray tube including an electron target structure comprising a plurality of interleaved sets of conducting strips for deriving respective component color signals, inherent coupling impedances existing between said sets of conducting strips, a plurality of respective component color signal channels, each of said signal channels including a signal amplifier, each of said strip sets being coupled to a respectively different one of said signal amplifiers, means for providing each said signal amplifier with an effective input impedance which is sufficiently low over said portion of the video frequency range that a relatively high degree of component color signal separation is maintained over said range portion, and additional means for causing the effective input impedance of each said signal amplifier to rise with frequency over another higher portion of the video frequency range.

4. A color television pickup tube system comprising the combination of a cathode ray tube including an electron target structure comprising a plurality of sets of conducting strips for deriving respective component color signals, inherent coupling impedances existing between said sets of conducting strips, said coupling impedances being essentially capacitive over a given range of signal frequencies, a plurality of signal amplifying means, each of said signal amplifying means being coupled to a respective one of said strip sets, means for establishing a negative feedback path in each of said signal amplifying means, each of said negative feedback paths being essentially inductive over a portion of said given range whereby the effective input impedance of each said signal amplifying means becomes increasingly high relative to said coupling impedances over said range portion.

5. A signal amplifying system in accordance with claim 4 wherein each of said negative feedback paths is essentially capacitive over another portion of said given range, the reactance of said feedback path over said other range portion being a predetermined fraction of the reactance of said coupling impedances.

6. A signal amplifying system in accordance with claim 4 wherein the negative feedback provided in each of said signal amplifying means is of such a degree over the remaining portion of said given range of signal frequencies as to establish an effective input impedance for each of said signal amplifying means which is of a substantially lower magnitude than the magnitude of said coupling impedances.

7. In a color television system wherein it is desired to utilize color information over only a portion of a total video frequency range, said color television system including a cathode ray pickup tube having an electron target structure comprising a plurality of interleaved sets of conducting strips for deriving respective component color signals, a camera preamplifier comprising a plurality of signal amplifying means, each of said strip sets being coupled to a respectively different one of said signal amplifying means, feedback means associated with each of said signal amplifying means for rendering the effective input impedance of each of said signal amplifying means frequency responsive, each of said feedback means including reactive circuit elements inter-related such that the effective input impedance of each said signal amplifying means decreases with frequency over said portion of the video signal frequency range and increases with frequency over the remaining portion of said video signal frequency range.

8. In a color television system, apparatus comprising the combination of a tri-color camera tube including three sets of interleaved signal strips for deriving three respective component color signals, inherent couping impedances existing between each signal strip set and the other signal strip sets, three component color signal channels, each of said signal channels including at least one amplifying stage having an output circuit and an input circuit, means for coupling the input circuit of each of said signal amplifying stages to a respectively different one of said sets of signal strips, means for establishing a negative feedback path between the output circuit and the input circuit of each of said amplifying stages, each of said negative feedback paths including a capacitor and an inductance in series, the values of each said inductance and capacitor being related in such a manner that the effective input impedance of each said signal amplifier is essentially capacitive over a first range of signal frequencies and essentially inductive over a second higher range of signal frequencies.

9. In a color television system, apparatus comprising the combination of a tri-color camera tube including three sets of interleaved signal strips for developing three respective component color signals, said signal strip sets being inherently coupled by impedances which are essentially capacitive over a given range of signal frequencies, three component color signal channels, each of said signal channels including at least one amplifying stage having an output circuit and an input circuit, means for coupling the input circuit of each of said signal amplifying stages to a respectively different one of said signal strip sets, means for establishing a negative feedback path between the output circuit and the input circuit of each of said amplifying stage, each of said negative feedback paths including a capacitor, an inductance and a resistor in series, the values of each said capacitor and inductance being related in such a manner that the effective input impedance of each said signal amplifier is essentially capacitive over a first portion of said given range and essentially inductive over a second higher portion of said given range, each said resistor establishing a minimum value which the input impedance of each signal amplifier approaches in its transition from an essentially capacitive condition to an essentially inductive condition in a portion of said given range intermediate said first and second portions.

10. Apparatus in accordance with claim 9 wherein the effective input impedance of each said signal amplifier throughout said first portion of said given range is substantially a predetermined fraction of said coupling impedances.

11. In a color television system wherein it is desired to utilize color information over only a portion of a total video frequency range, a pickup tube system comprising the combination of a cathode ray tube including an electron target structure comprising a plurality of interleaved sets of conducting strips for deriving respective component color signals, inherent coupling impedances existing between said sets of conducting strips, a plurality of respective component color signal channels, each of said signal channels including a signal amplifier having an input circuit and an output circuit, each of said strip sets being coupled to a respectively different one of said input circuits, means for providing each signal amplifier with a negative feedback path to the input circuit thereof, the impedance of each negative feedback path being such that over said portion of the total video frequency range the input impedance of each signal amplifier is sufficiently low relative to said inherent coupling impedances that a relatively high degree of component color signal separation is maintained over said range portion, each said negative feedback path including an inductance, said inductance being such that over the remaining portion of the total video frequency range the input impedance of each signal amplifier is essentially inductive whereby substantially complete crosstalk of the component color signals is obtained between said strip sets over said remaining range portion.

References Cited in the file of this patent

UNITED STATES PATENTS

| | | |
|---|---|---|
| 2,615,976 | Rose | Oct. 28, 1952 |
| 2,634,328 | Goodale | Apr. 7, 1953 |